(12) United States Patent
Lindoff et al.

(10) Patent No.: US 9,100,073 B2
(45) Date of Patent: Aug. 4, 2015

(54) WIRELESS COMMUNICATIONS SYSTEM AND METHOD (75) Inventors: Bengt Lindoff, Bjärred (SE); Leif Wilhelmsson, Dalby (SE); Thomas Olsson, Karlshamn (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/881,402

(22) PCT Filed: Oct. 21, 2011

(86) PCT No.: PCT/EP2011/068422
§ 371 (c)(1),
(2), (4) Date: Jun. 28, 2013

(87) PCT Pub. No.: WO2012/055778
PCT Pub. Date: May 3, 2012

(65) Prior Publication Data
US 2014/0072066 A1     Mar. 13, 2014

Related U.S. Application Data (60) Provisional application No. 61/408,103, filed on Oct. 29, 2010.

(30) Foreign Application Priority Data

Oct. 25, 2010   (EP) .................................. 10188734

(51) Int. Cl.
*H04B 7/02*   (2006.01)
*H04B 7/06*   (2006.01)
(Continued)

(52) U.S. Cl.
CPC ............ *H04B 7/0608* (2013.01); *H04B 7/0417* (2013.01); *H04B 7/0691* (2013.01); *H04B 7/0874* (2013.01)

(58) Field of Classification Search
CPC ............. A01B 12/0068; H04B 7/0417; H04B 7/0691; H04B 7/0874
USPC ......... 375/141, 146, 147, 219, 220, 260, 267, 375/299, 340, 347; 343/700 R, 703, 751
See application file for complete search history.

(56) References Cited

U.S. PATENT DOCUMENTS

| | | | |
|---|---|---|---|
| 5,195,106 A | 3/1993 | Kazecki et al. | |
| 6,240,274 B1 | 5/2001 | Izadpanah | |

(Continued)

FOREIGN PATENT DOCUMENTS

| | | |
|---|---|---|
| EP | 1 830 487 A2 | 9/2007 |
| WO | 2010085722 A1 | 7/2010 |

OTHER PUBLICATIONS

International Search Report and Written Opinion dated Nov. 16, 2011 for International Application No. PCT/EP2011/068422, International Filing Date: Oct. 21, 2011 consisting of 11-pages.

(Continued)

*Primary Examiner* — Dac Ha
(74) *Attorney, Agent, or Firm* — Christopher & Weisberg, P.A.

(57) ABSTRACT

Disclosed herein is a method of communicating a digital signal via a wireless communications channel between a transmitter and a receiver, at least one of the transmitter and the receiver comprising a plurality of transducers for transforming a signal between an electrical signal and a wireless signal. Embodiments of the method comprises determining (S302; S602) a property of the communications channel; based on at least the determined property, selecting (S303, S305) a number of transducers from the plurality of transducers; and communicating (S304) a digital signal from the transmitter to the receiver using the selected number of transducers.

16 Claims, 4 Drawing Sheets

(51) Int. Cl.
  *H04B 7/04* (2006.01)
  *H04B 7/08* (2006.01)

(56) References Cited

U.S. PATENT DOCUMENTS

| | | | |
|---|---|---|---|
| 6,700,865 B1* | 3/2004 | Yamamoto et al. | 370/208 |
| 8,175,183 B2* | 5/2012 | Nagahama et al. | 375/267 |
| 2001/0049295 A1* | 12/2001 | Matsuoka et al. | 455/562 |
| 2006/0105724 A1 | 5/2006 | Nakao | |
| 2006/0294170 A1* | 12/2006 | Matsuoka et al. | 708/300 |
| 2007/0207837 A1 | 9/2007 | Nakaya | |
| 2008/0031368 A1* | 2/2008 | Lindoff et al. | 375/260 |
| 2008/0212723 A1* | 9/2008 | Mochizuki et al. | 375/346 |
| 2012/0106613 A1* | 5/2012 | Piazza et al. | 375/227 |

OTHER PUBLICATIONS

2nd Written Opinion dated Sep. 26, 2012 for International Application No. PCT/EP2011/068422, International Filing Date: Oct. 21, 2011 consisting of 5-pages.

International Report on Patentability dated Dec. 13, 2012 for International Application No. PCT/EP2011/068422, International Filing Date: Oct. 21, 2011 consisting of 18-pages.

Lee et al. "Performance Analysis of Beamforming Techniques in Ad-hoc Communication between Moving Vehicles" Proceedings of Asia-Pacific Conference on Communications 2007, pp. 185-188, Oct. 18, 2007 consisting of 4-pages.

Molisch, Andreas .F.; Novak, Heinz.; Fuhl, Josef ; Bonek, Ernst., of Tech. Univ. Wien, Austria, "Reduction of the Error Floor of MSK by Selectin Diversity", IEEE Transactions on Vehicular Technology, vol. 47(4):1281-1291, publication date Nov. 1998 consisting of 11-pages.

Halls, G.A. and Chandler, D.P, both of Roke Manor Research Ltd., Romsey, UK, "Radio interface requirements for mobile communications systems in the year 2000 and beyond" Mobile Communications in the Year 2000, pp. 8/1-8/7, IEE Colloquium, Conference in London on Jun. 9, 1992 consisting of 7-pages.

Niknejad, A.M, Berkeley Wireless Research Center, Berkeley, CA, USA, "Siliconization of 60 GHz", IEEE Microwave Theory and Techniques Society, Microwave Magazine, IEEE, vol. 11(11):27-85 dated of publication Feb. 2010 consisting of 8-pages.

\* cited by examiner

WIRELESS COMMUNICATIONS SYSTEM AND METHOD

TECHNICAL FIELD

Disclosed herein are a communications method, system and apparatus for communicating data via a wireless communications channel.

BACKGROUND

The need for very high data transmission, on the order of 1 Gbit/s over short distances, on the order of a few meters, is one of the drivers behind the development of transmission equipment for use in the 60 GHz frequency band. Because there is about 7 GHz available around 60 GHz, this means that very large data rates can be supported still having quite relaxed requirements on spectrum efficiency.

Typical application where this kind of equipment can be envisioned is for high speed modes of WLAN, for wireless High Definition Multimedia Interface (HDMI), etc.

Although there is plenty of bandwidth available, there is an inherent drawback by operating at 60 GHz, namely that the propagation attenuation is increased significantly as the attenuation is proportional to the carrier frequency squared. This is the reason why only short distances can be supported with reasonable transmission power. However, the large propagation attenuation also has an advantage in that the interference from other transmitters using the same band will quickly decay to below the thermal noise floor so that it will not have any noticeable impact.

As one of the envisioned applications of very high data transmission is for consumer electronics, and often as cable replacement, it can be expected that it is desired that the transmitter and receiver are as low-complex as possible in order to allow for low cost implementation as well as low power consumption.

As the data rate increases, the bit duration, Tb, will decrease correspondingly, which means that the delay spread due to multi-path propagation will be more of an issue and this would normally require channel equalization. A rule of thumb is that in an equalizer is needed in case the rms delay spread of the channel exceeds 10% of Tb.

For a data rate of 1 Gb/s, Tb is 1 ns, so that the delay spread must not exceed 0.1 ns according to the above rule of thumb, in order to avoid the need for an equalizer in the receiver.

A delay spread this small does in practice correspond to that only one single transmission path exists between the transmitter and the receiver. Because of the large propagation attenuation mentioned above, the delay spread for a channel measured at 60 GHz will be considerably smaller than if the channel is measured at for instance 2.4 GHz. Although the delay spread in fact has been found to be relatively small, several components in the multi-path profile are typically experienced. To further reduce the delay spread, and sometimes also to effectively reduce the multi-path channel to a single path, multiple antennas at the transmitter and the receiver may be used. The idea is essentially to use beam-forming to further suppress all but the strongest component in the multi-path channel.

Seong-Gu Lee et. al. "Performance Analysis of Beamforming Techniques in Ad-hoc Communication between Moving Vehicles", in Proceedings of Asia-Pacific Conference on Communications, 2007 found that the rms delay spread can significantly be reduced by using beam-forming techniques. However, in particular in the context of consumer products, it remains desirable to provide a low-complex system that can operate at high data rates while at the same time reducing the power consumption.

SUMMARY

Disclosed herein is a method of communicating a signal via a wireless communications channel between a transmitter and a receiver, at least one of the transmitter and the receiver comprising a plurality of transducers for transforming a signal between an electrical signal and a wireless signal, the method comprising:
  determining a measured or at least estimated delay spread of the wireless communications channel;
  based on at least the determined delay spread, selecting a number of transducers from the plurality of transducers;
  communicating a wireless signal from the transmitter to the receiver using the selected number of transducers.

Selecting a number of transducers comprises selecting said number sufficiently high to cause the delay spread to be smaller than a predetermined threshold.

In some embodiments, the wireless signal may be a radio-frequency signal e.g. in the frequency range above 1 GHz. For example, the wireless signal may be in the frequency range between 1 GHz and 100 GHz, e.g. larger than 10 GHz, such as larger than 50 GHz. The transducers may be antennas. The probability for achieving a single path channel increases as the number of antenna elements in the transmitter and/or the receiver is increased.

Hence, by adapting the number of transducers used in the transmitter and/or receiver based on determined channel conditions, the communications system can ensure that the quality of the received signal is sufficiently high to be processable by a receiver of low complexity. In some embodiments, the method may select said number of transducers sufficiently high to allow processing the communicated wireless signal by the receiver without an equalizer, thus allowing use of an equalizer-free receiver. In cases where it is not feasible or desirable to achieve a transmission link where an equalizer can be avoided, the required complexity of the equalizer may be reduced by adapting the number of antennas to the detected channel conditions. At the same time, the required signal processing resources and power consumption of the transmitter and/or receiver are kept low as only the selected subset of the available antennas and the corresponding signal paths in the signal processor are used, thus reducing the required power consumption and the required signal processing resources.

The determined property may be a measured or at least estimated delay spread of the received signal, e.g. the root-mean-squared (rms) delay spread Trms. Alternatively, the determined property may be another direct or indirect measure indicative of the delay spread, e.g. a measure indicative of the number of distinct propagation paths in a multi-path transmission channel. The property may be determined by way of one or more measurements and/or estimated based on one or more measurements. In some embodiments, determining comprises communicating a test signal, e.g. comprising a predetermined sequence of symbols known to the receiver, from the transmitter to the receiver using a least a subset of said plurality of transducers, and estimating said property from the test signal received by the receiver.

Some embodiments of the method disclosed herein may thus comprise comparing the determined property with a predetermined threshold value, e.g. the method may comprise comparing the rms delay spread with a predetermined fraction of the bit duration, e.g. 10% of the bit duration, i.e. a predetermined fraction of the time required to transmit a bit of information. Selecting may thus comprise selecting said number sufficiently high, e.g. to be the smallest number that is sufficiently high, to cause the determined property to be smaller than a predetermined threshold value. It will be appreciated that, depending on the definition of the property and the threshold, said number may be selected sufficiently high to cause the determined property to be larger than a predetermined threshold value instead. Hence, in some embodiments of the method described herein, the most suitable trade-off between complexity in beam-forming and the complexity in the demodulation at the receiver is obtained. One special case is to ensure that the reception can be performed without the need for a channel equalizer. Since the need for an equalizer may be avoided provided Trms<k*Tb, for a predetermined constant k, e.g. k=0.1, embodiments of the invention ensure that this condition is fulfilled in the most efficient way.

The communicated signal may comprise uncoded data or encoded data. Embodiments of the present invention are applicable to either case of communicated signal. In some embodiments, providing a sufficiently large antenna array from which a sufficiently large number of antennas may be selected in all situations based on the detected channel conditions may not always be desirable or feasible because of the required size of the array. Hence, in some embodiments, the method comprises, based on the determined property, selecting said number of transducers and a bit rate; and wherein communicating comprises communicating data at the selected bit rate. Hence, some embodiments may thus allow for transmission that does not require an equalizer at the receiver in a flexible and low-complex way and even with a limited number of antennas. This may be achieved by adapting the bit rate as well as the number of antennas used in the transmitter and/or the receiver such that the requirement where an equalizer is not needed is just fulfilled.

The bit rate may be adapted by changing the modulation scheme, thus changing the number of bits communicated per communicated symbol, and/or by changing the symbol rate, i.e. by changing the number of transmitted symbols per second. In some embodiments, a simple modulation scheme, e.g. a binary phase-shift keying (BPSK) modulation scheme, may be used in combination with a variable symbol rate that is adaptable responsive to the channel conditions, thus providing a low-complex, efficient communication scheme to provide high data rates at high transmission frequencies.

In a communications system multiple transducers may be provided on the transmitter and/or on the receiver side. In some embodiments, communicating comprises performing a beam-forming signal processing operation by at least one of the transmitter and the receiver for directional signal communication using the selected number of transducers. Beam-forming using a plurality of transducers has been shown to drastically reduce the rms delay spread (see e.g. Seong-Gu Lee et. al.: "Performance Analysis of Beamforming Techniques in Ad-hoc Communication between Moving Vehicles", in Proceedings of Asia-Pacific Conference on Communications, 2007).

In some embodiments, the transmitter comprises a first plurality of transmitting transducers and the receiver comprises a second plurality of receiving transducers; selecting comprises selecting a first number of said transmitting transducers and a second number of said receiving transducers; and communicating comprises communicating the digital signal using the selected first number of transmitting transducers and second number of receiving transducers. Hence, the method allows optimising the power consumption of the transmitter and/or the receiver, e.g. depending on available resources at the transmitter and/or the receiver. Consequently, increased flexibility is provided allowing a reduction of the system complexity.

The present invention relates to different aspects including the method described above and in the following, corresponding apparatus, systems and products, each yielding one or more of the benefits and advantages described in connection with the above-mentioned methods, and each having one or more embodiments corresponding to the embodiments described in connection with one the above-mentioned methods.

More specifically, according to another aspect, a communications device for communicating a signal via a wireless communications channel may comprise:
a plurality of transducers for transforming a signal between an electrical signal and a wireless signal, wherein the communications device is adapted to:
determine a property of the wireless communications channel indicative of a delay spread of the wireless communications channel;
based on at least the determined property, select a number of transducers from the plurality of transducers;
communicate a wireless signal using the selected number of transducers.

Accordingly, embodiments of the communications device comprise a signal processing unit for performing a beam-forming operation of the electrical signal. Some embodiments comprise circuitry for determining an rms delay spread. Some embodiments comprise a comparator circuit for comparing the determined delay spread with a predetermined threshold. Some embodiments comprise a control circuit for controlling the signal processing unit to perform the beam-forming operation using only a selected subset of the plurality of transducers. In some embodiments the signal processing unit is adapted to selectively communicate data at a plurality of different bit rates; and the control circuit is adapted to control the signal processing unit to communicate the data at a selected it rate.

A communications system may comprise: a transmitter device and a receiver device adapted to communicate with each other via a wireless communications channel, at least one of the transmitter device and the receiver device comprising a plurality of transducers for transforming a signal between an electrical signal and a wireless signal, wherein the system is adapted to:
determining a property of the wireless communications channel indicative of a delay spread of the wireless communications channel;
based on at least the determined property, selecting a number of transducers from the plurality of transducers;
communicating a wireless signal from the transmitter device to the receiver device using the selected number of transducers.

The term communications device is intended to comprise stationary and portable radio communications equipment. The term portable radio communications equipment includes all equipment such as mobile telephones, pagers, communicators, electronic organisers, smart phones, personal digital assistants (PDAs), handheld computers, laptop computers, or the like. The term communications device further comprises communications equipment for use as part of a communications network, e.g. wireless access points, wireless network cards or interfaces, etc.

BRIEF DESCRIPTION OF THE DRAWINGS

The above and other aspects will be apparent and elucidated from the embodiments described in the following with reference to the drawing in which.

DETAILED DESCRIPTION

The following embodiments are described in the context of a receiver in which an equalizer can be avoided. However, it will be appreciated that embodiments of the method and system described herein may also be applied to achieve a more general trade-off between complexity in beam-forming and complexity in the channel equalizer.

Figure 1:
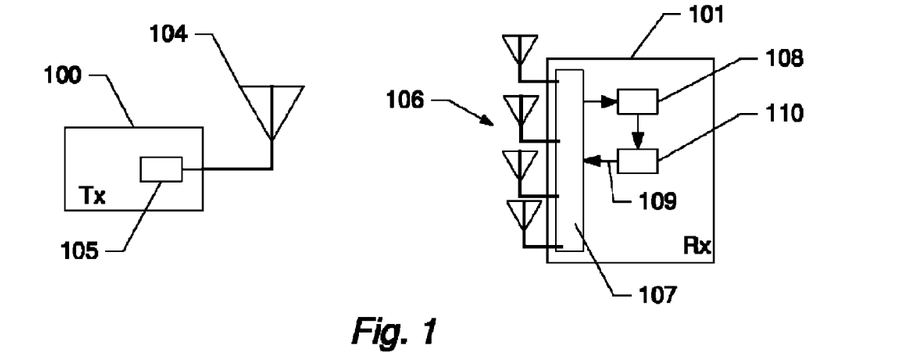
FIG. 1 shows a schematic block diagram of a communications system.

FIG. 1 shows a schematic block diagram of a communications system comprising a transmitter 100 and a receiver 101. The transmitter 100 comprises an antenna 104 and a signal processing unit 105 connected to the antenna. The receiver 101 comprises an antenna array 106 comprising a plurality of antennas, and a signal processing unit 107 connected to the antenna array. In the example of FIG. 1, the antenna array is shown to comprise 4 antennas. However, it will be appreciated that the array may comprise a different number of antennas. The signal processing unit 105 may comprise one or more of the following components: an amplifier, circuitry for D/A conversion of the digital signal to be transmitted, and a modulator for modulating the signal to be transmitted. The signal processing unit 107 may comprise one or more of the following components: an amplifier, circuitry for A/D conversion of the received signal, a beamforming circuit, and a demodulator for demodulating the received signal. The beamforming circuit receives signals from all or a selected subset of the antennas of the antenna array and performs a beamforming operation to receive signals from a desired direction and attenuate signals from undesired directions. This may be done by controlling the amplitude and the phase of signals received at each of the selected antennas. The beamforming operation results in a decrease of interference from multipath signals from undesired directions and increases the power of the received signal from the desired direction. The beamforming circuit may implement any suitable beamforming technique known as such in the art, e.g. the Minimum Variance Estimator for beamforming. Generally, beamforming is a signal processing technique used in transducer (antenna) arrays for directional signal transmission or reception. A spatial selectivity is achieved by using adaptive or fixed receive/transmit beam patterns. For example in the receiver, this can be used by combining the receiver antennas so that a suitable antenna beam pattern is formed for improved reception performance. The improvement compared with an omni-directional reception/transmission is known as the receive/transmit gain or loss.

Generally, while the present description refers to a transmitter and a receiver, it will be appreciated that in some embodiments the transmitter and the receiver may be components of respective devices that each comprises both transmitters and receivers thus allowing two-way communication. The receiver of FIG. 1 further comprises circuitry 108 for determining the delay spread of the received signal. The delay spread determination circuit 108 may comprise a matched filter and the circuit 108 receives the demodulated signal from the signal processing unit 107. The circuit 108 is adapted to determine the rms delay spread and to feed the determined delay spread into a control circuit 110 for selecting the number of antennas. The circuit may determine the delay spread using any suitable method known as such in the art. Such a method might be based on first estimating the impulse response of the channel and based on this determine the delay spread, or it might be based on first estimating how frequency selective the channel is, by for instance calculating the number of dips per MHz in the channel's amplitude function. For example, the control circuit 110 may comprise a comparator adapted to compare the determined rms delay spread with the bit duration of the received signal multiplied by a predetermined constant.

Based on this comparison, the control circuit 110 is adapted to determine whether the currently selected number of antennas is appropriate or whether the number should be changed. For example, if the determined rms delay spread is larger than the bit duration multiplied by the predetermined constant, the control circuit may determine that the number of antennas should be increased until the rms delay spread is smaller than the bit duration multiplied by the predetermined constant or until all antennas of the array are in use. It will be appreciated that the control circuit may also be configured to decrease the number of antennas, e.g. when the ration of the delay spread and the bit duration is smaller than a certain predetermined threshold. Alternatively or additionally, the control circuit may estimate the actual number of antennas to be used and/or an estimated increment/decrement by which the number is to be changed. The estimate may e.g. be based on a suitable model describing how the delay spread varies with the number of antennas, e.g. that the delay spread is inversely proportional to the number of antennas. The control circuit is further adapted to feed a control signal 109 into the signal processing unit 107 for controlling the signal processing unit to perform the processing of the received signal based on the selected number of antennas.

Figure 2:
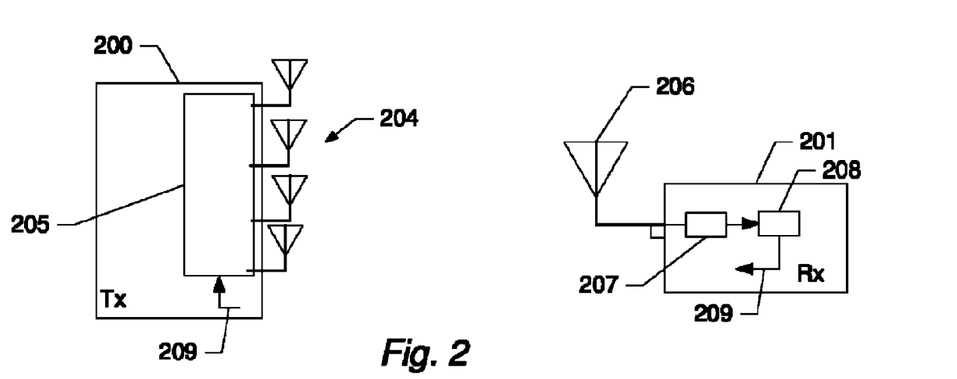
FIG. 2 shows a schematic block diagram of a communications system.

FIG. 2 shows a schematic block diagram of a communications system comprising a transmitter 200 and a receiver 201. The transmitter 200 comprises an antenna array 204 and a signal processing unit 205 connected to the antenna array. The receiver 201 comprises an antenna 206 and a signal processing unit 207 connected to the antenna. For example, the signal processing unit 207 may comprise one or more of the following components: an amplifier, circuitry for A/D conversion of the received signal, and a demodulator for demodulating the received signal. The signal processing unit 205 may comprise one or more of the following components: an amplifier, circuitry for D/A conversion of the digital signal to be transmitted, a modulator for modulating the signal to be transmitted, and a beamforming circuit. The beamforming circuit may be adapted to perform a beamforming operation to transmit signals predominantly into a desired direction. This may be done by controlling the amplitude and the phase of signals transmitted by each of the selected antennas of the array 204.

The receiver of FIG. 2 further comprises circuitry 208 for determining the delay spread of the received signal. The delay spread determination circuit 208 may comprise a matched filter and the circuit 208 receives the demodulated signal from the signal processing unit 207. The circuit 208 is adapted to determine the rms delay spread. The receiver 201 further comprises a control circuit 210 adapted to receive the determined delay spread and to determine whether the number of transmit antennas should be changed as described in connection with FIG. 1. The control circuit is further adapted to signal a control signal 209 to the transmitter 200, e.g. via a transmit signal path and a suitable transmitter circuit of the receiver 201 (not explicitly shown). For example, the control signal may indicate to the transmitter to change, e.g. increase, the number of antennas. The control signal may even indicate the required number of antennas.

The transmitter 200 is adapted to receive the control signal, e.g. via a receive signal path and a suitable receiver circuit of the transmitter 200 (not explicitly shown), and to feed the received control signal into the signal processing unit 205 so as to cause the signal processing unit to transmit a beam-formed signal using a different number of antennas as indicated by the received control signal.

Figure 3:
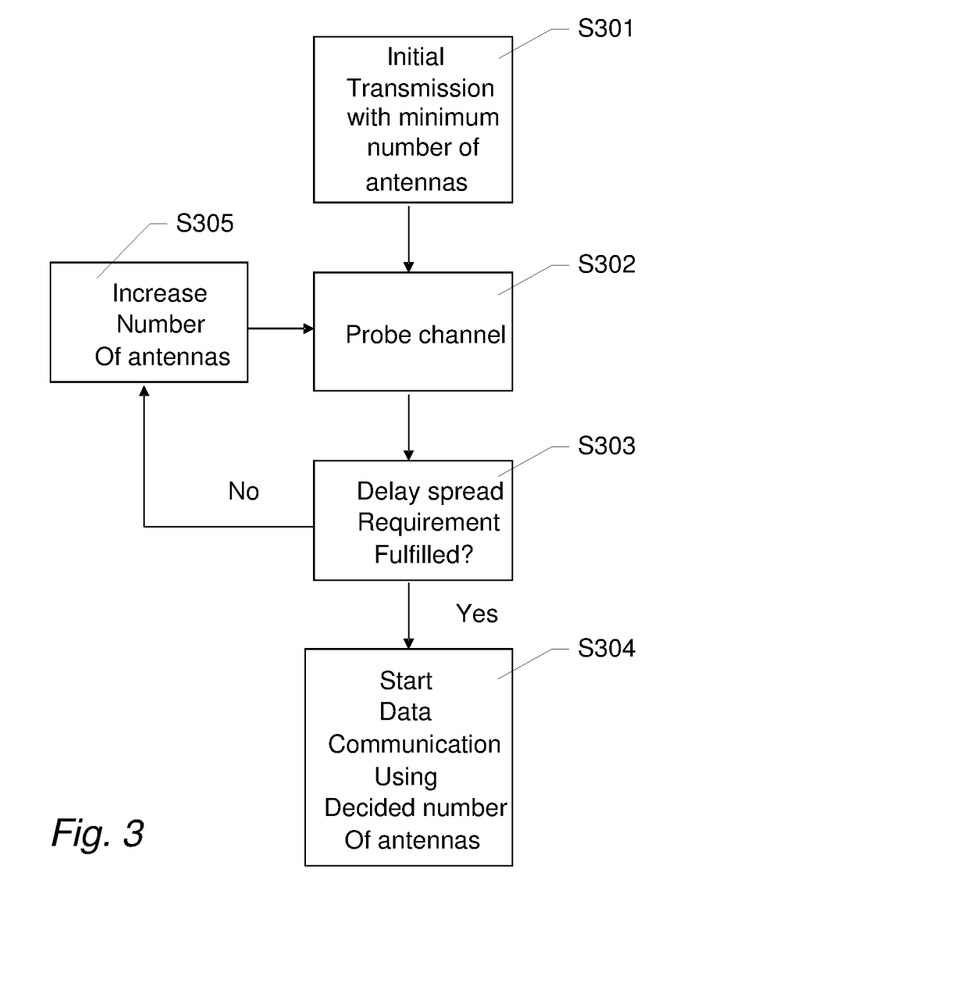
FIG. 3 shows a flow diagram of a communication process in a communication system.

FIG. 3 shows a flow diagram of a communication process in a communication system, e.g. the system shown in FIG. 2, wherein more than one antenna is used at the transmitter, and wherein the system is configured as a master-slave system in which the receiver operates as a master unit and the transmitter operates as a slave unit.

In some embodiments, the minimum number of antennas that is needed in order to effectively reduce the delay spread such that the above mentioned relationship between the rms delay spread and the bit rate is fulfilled is determined and then used in the actual communication. The reason why it is desirable to use the minimum number of antennas is that this gives the lowest complexity as well as lowest power consumption. For example, the minimum number may be determined iteratively as will now be described with reference to FIG. 3.

The minimum number of antennas that is large enough to cause a predetermined relation between the rms delay spread and intended bit duration may be determined by starting with only one antenna at the transmitter TX and then increase the number of antennas until the rms delay spread is sufficiently reduced. For example, the predetermined relation may be $Trms<k*Tb$ where Tb is the bit duration, i.e. the inverse of the bit rate, Trms is the rms delay spread, and k is a predetermined constant e.g. k=0.1. It will be appreciated, however, that such an iterative process may also start by using all the antennas and successively decreasing the number of antennas as much as possible, or start at an intermediate number and then increase or decrease the number depending on the measured rms delay spread.

In the embodiment of FIG. 3, primarily a TDD transmission scheme is used, since channel measurements from master to slave then also provide accurate information about the channel between slave and master. However, it will be appreciated that embodiments of the method and system described herein may also be implemented in combination with other transmission schemes.

Initially, an initial synchronization step S301 is performed, which may be performed using synchronisation techniques well known as such in the art. During the initial step S301, the master unit further informs the slave unit to transmit a probing signal with lowest possible number of transmit antennas. During a subsequent probing step S302, the master may request the slave unit to transmit a (known) symbol sequence to the master for estimating the channel. In step S303, based on the received probing signal, the master unit determines the channel conditions and determines whether the signal can be beamformed (e.g. by digital pre-coding the symbols) such that the desired delay spread requirement is fulfilled. If this is the case, the actual transmission is started in step S304 using the selected number of antennas. The actual transmission may be performed using any suitable communications protocol. Otherwise, i.e. if the above requirement is not fulfilled, the master unit informs the slave unit to increase the number of antennas (S305), and the process returns to step S302.

In the embodiment of FIG. 3, only the number of transmission antennas is selected. However, it will be appreciated that alternatively or additionally, the number of reception antennas may be adapted. In an embodiment where only the number of antennas at the master is changed, e.g. in the embodiment of FIG. 1, when the receiver operates as the master unit, the master does not need to inform the slave to increase/decrease the number of transmit antennas.

In some embodiments, when both the transmitter and the receiver comprise an antenna array from which a subset of antennas may selectively be used, and which is operated as a master-slave system, the master may initially increase the number of antennas at the master, in order to allow use of the smallest possible number of antennas at the slave unit. Such a selection strategy may be desirable in certain embodiments, e.g. in order to save battery power in the master or slave unit, as the case may be. In this case the antenna configuration may be selected as a result of a suitable negotiation scheme between master and slave unit. This may imply starting the increase in number of antenna elements in either master or slave and increasing the number of elements in the other unit only when the first unit has full antenna configuration. A situation where this is in particularly useful is when one of the devices is battery powered whereas the other device is connected to a power outlet.

Figure 4:
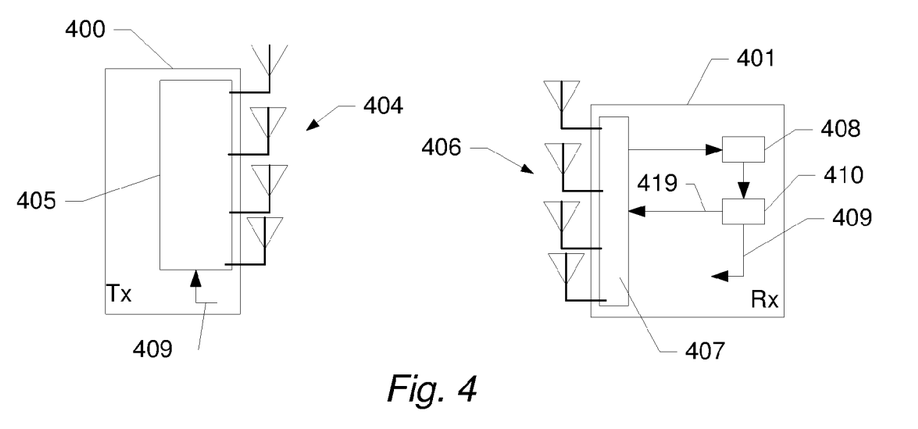
FIG. 4 shows a schematic block diagram of a communications system.

FIG. 4 shows a schematic block diagram of a communications system comprising a transmitter 400 and a receiver 401. In this example, both the receiver and the transmitter comprise respective antenna arrays 404 and 406, each comprising a respective plurality of antennas. It will be appreciated that the antenna arrays 404 and 406 may comprise the same or a different number of antennas. The transmitter 400 further comprises a signal processing unit 405 connected to the antenna array 404, and the receiver 401 comprises a signal processing unit 407 connected to the antenna array 406.

The receiver of FIG. 4 further comprises circuitry 408 for determining the delay spread of the received signal. The delay spread determination circuit 408 may comprise a matched filter and the circuit 408 receives the demodulated signal from the signal processing unit 407. The circuit 408 is adapted to determine the rms delay spread. The receiver 401 further comprises a control circuit 410 adapted to receive the determined delay spread value and to determine whether the number of transmit antennas should be changed, e.g. as described in connection with FIG. 1. If the number should be changed, the control circuit further determines whether the number of antennas should be changed at the receiver or at the transmitter. If the control circuit determines that the number of antennas at the transmitter should be changed, the control circuit is adapted to signal a control signal 409 to the transmitter 400, e.g. via a transmit signal path and a suitable transmitter circuit of the receiver 401 (not explicitly shown). For example, the control signal may indicate to the transmitter to change, e.g. increase, the number of antennas. The control signal may even indicate the required number of antennas. For example, the control circuit may implement a suitable function, a table, or other suitable mapping that associates the delay spread and the number of antennas. Using a delay spread estimate, the control circuit may thus determine the number of needed antennas. If the control circuit determines that the number of antennas at the receiver should be changed, the control circuit is adapted to feed a corresponding control signal 419 to the signal processing unit 407 so as to cause the signal processing unit to perform a beamforming operation on the received signal based on a different number of antennas.

The transmitter 400 is adapted to receive the control signal, e.g. via a receive signal path and a suitable receiver circuit of the transmitter 400 (not explicitly shown), and to feed the received control signal into the signal processing unit 405 so as to cause the signal processing unit to transmit a beamformed signal using a different number of antennas as indicated by the received control signal.

Figure 5:
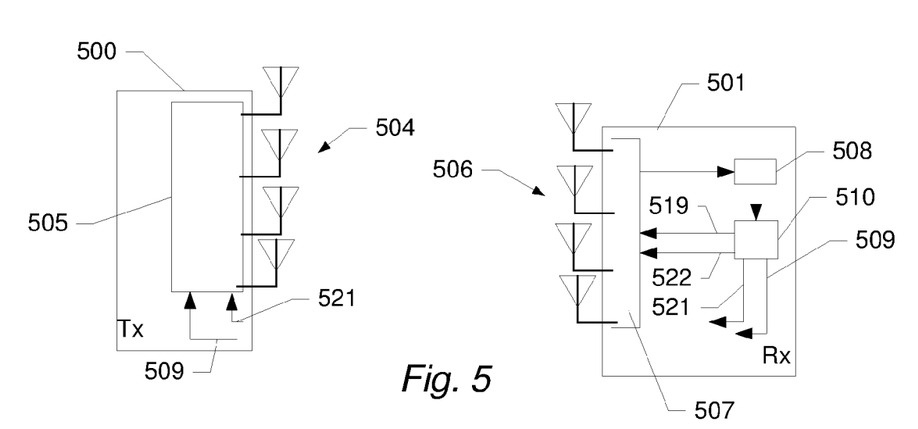
FIG. 5 shows yet another example of a communications system.

FIG. 5 shows yet another example of a communications system comprising a transmitter 500 and a receiver 501. The system of FIG. 5 is similar to the system of FIG. 4 in that both the receiver and the transmitter comprise respective antenna arrays 504 and 506, each comprising a respective plurality of antennas. The transmitter 500 further comprises a signal processing unit 505 connected to the antenna array 504, and the receiver 501 comprises a signal processing unit 507 connected to the antenna array 506. The receiver further comprises circuitry 508 for determining the delay spread of the received signal and a control circuit 510 adapted to receive the determined delay spread and to determine whether the number of transmit antennas should be changed. If the control circuit determines that the number of antennas at the transmitter should be changed, the control circuit is adapted to signal a control signal 509 to the transmitter 500. If the control circuit determines that the number of antennas at the receiver should be changed, the control circuit is adapted to feed a corresponding control signal 519 to the signal processing unit 507 so as to cause the signal processing unit to perform a beamforming operation on the received signal based on a different number of antennas. The transmitter 500 is adapted to receive the control signal and to feed the received control signal into the signal processing unit 505 so as to cause the signal processing unit to transmit a beamformed signal using a different number of antennas as indicated by the received control signal, all as described in connection with FIG. 4.

In the embodiment of FIG. 5, the transmitter and receiver are adapted to possibly be operable at different bit rates as controlled by respective control signals 521 and 522 fed into the respective signal processing units.

Reducing the bit rate on a communication link may be achieved by reducing the code rate and/or reducing the size of the modulation alphabet while keeping the symbol rate transmitted over the channel constant, since this typically is determined by the sampling rate. Alternatively, in some embodiments, the communications system reduces the bit rate by actually reducing the used symbol rate. Specifically, in one embodiment, a simple modulation may be used all the time, e.g. a binary phase shift keying (BPSK) with no error correcting coding. Such an embodiment allows communication and signal processing at a very high data rate. Thus the symbols are binary and the bit rate transmitted over the channel may be reduced by reducing the symbol rate.

In the embodiment of FIG. 5, the control circuit 510 of the receiver determines, based on the probing signal, whether the number of antennas at the receiver and/or transmitter should be changed, and/or whether the bit rate of the transmission should be changed. A change in the number of antennas is controlled as described in connection with FIG. 4. If the control circuit determines that the bit rate should be changed, the control circuit signals control signal 521 to the transmitter and feeds a corresponding control signal 522 to the signal processing unit of the receiver.

Figure 6:
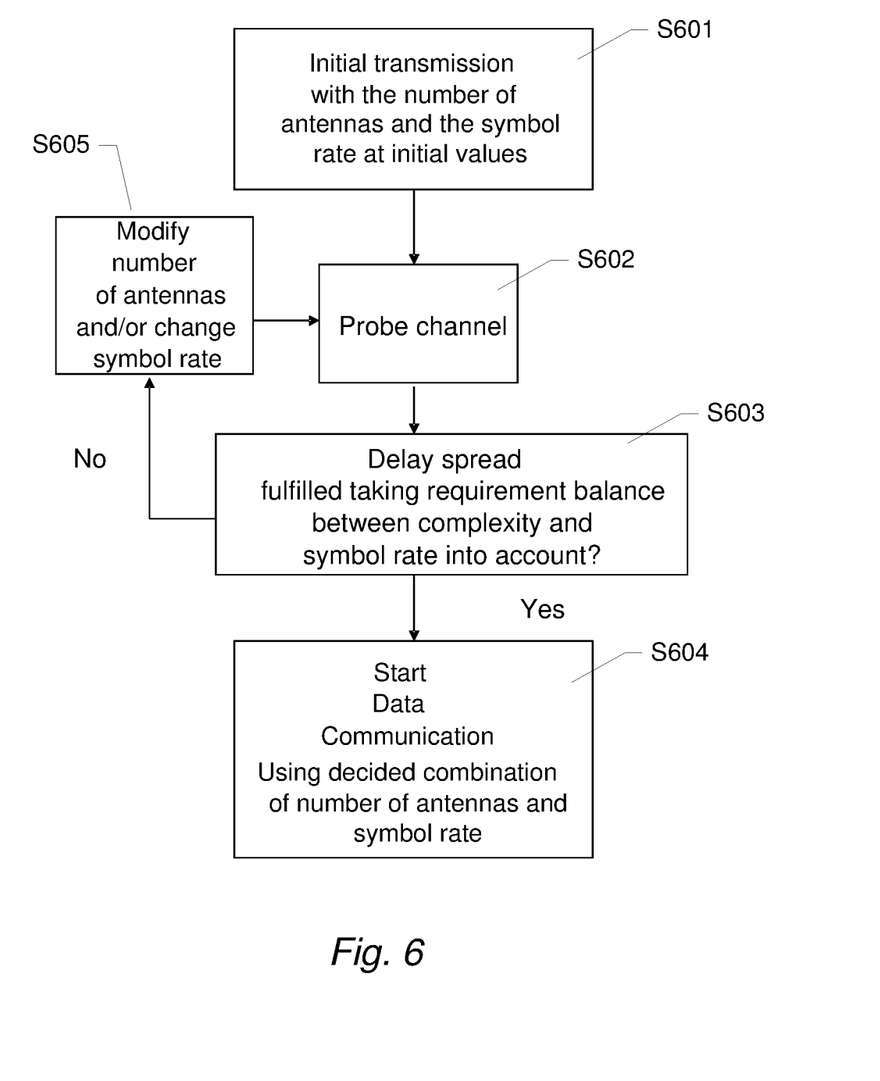
FIG. 6 shows a flow chart of a communication process.

FIG. 6 shows a flow chart of a communication process in a communication system e.g. the system of FIG. 5 which is operable with a variable number of antennas and with a variable bit rate, and wherein the receiver is operated as a master unit and the transmitter is operated as a slave unit. The system may operate using a TDD transmission scheme, since channel measurements from master to slave then provide accurate information on the channel between the slave and the master and vice versa. During an initial synchronisation step S601, the master informs (using a sufficiently low bit rate) the slave to transmit a probing signal at an initial (e.g. a high) bit rate and with an initial number of antennas, e.g. the smallest number of antennas with which the master can operate (e.g. a single antenna). The subsequent probing step S602 may comprise the slave unit transmitting (with the initial bit rate and initial number of antennas) to the master unit a predetermined signal known to the master; the master receives the probing signal with an initial number of receiving antennas. In step S603, the master uses the received probing signal to estimate the channel conditions, in order to see whether the signal can be received such that a predetermined delay spread relationship is fulfilled. This may further imply determining whether a desired or required balance between the complexity (e.g. in terms of numbers of antennas) and symbol rate is fulfilled. If yes, the process proceeds at step S604, wherein the actual transmission starts using the decided symbol rate and number of antennas, and according to a suitable communication protocol. Otherwise, the process proceeds at step S605, where the master unit determines a change in the number of antennas and/or the symbol rate, based on a predetermined decision algorithm. This change may include an increase or a decrease of the number of antennas and/or an increase or decrease of the symbol rate, depending on whether the delay spread relationship is fulfilled and depending on whether the desired balance between symbol rate and complexity is fulfilled. For example, the master may decide to initially increase the number of antennas at the receiver. If the maximum number of receiver antennas has been reached and the delay spread condition is still not fulfilled, the master may signal the transmitter to increase the number of transmit antennas. If an increase to the maximum number of transmit antennas still is not sufficient to fulfil the delay spread condition, the master may cause the symbol rate to be decreased until the delay spread conditions is fulfilled. It will be appreciated though, that alternative decision schemes may be used instead. In general, the above steps implement a process to trade antenna complexity for symbol rate while fulfilling the delay spread requirement. In step S605, if the master unit decides to change the number of antennas at the master, the master performs this change. If the master decides to change the number of antennas at the slave and/or to change the bit rate, the master signals this change request to the slave. Subsequently, the process proceeds at step S602 to determine whether the implemented change is sufficient to fulfil the delay spread condition and/or the desired balance between complexity and symbol rate.

Even though the method and system disclosed herein have mainly been described with reference to specific embodiments, it will be appreciated that the method and system disclosed herein may also be implemented in connection with alternative embodiments. For example, the method and system disclosed herein have mainly been described in connection with a master-slave system in which one the communicating devices operates as a master unit and the other unit operates as a slave unit. However, it will be appreciated that the method and system disclosed herein may also be implemented in the context of alternative communications system where the selection of a number of antennas from a sub-array may be performed by one of the communicating devices alone or by means of another suitable negotiation scheme between the communicating devices.

Furthermore, even though embodiments of the method and system disclosed herein have mainly been described in the context of antennas and radio-frequency communication, it will be appreciated that the method and system may also be applied in combination with other forms of transducers and/or communications signals.

It will be appreciated that in alternative embodiments, only the symbol rate and the number of antenna elements at either the receiver or the transmitter may be variable. The selection of both the symbol rate and the number of transmit and/or receive antennas allows trading off between symbol rate and complexity (power).

Generally, in some embodiments, a saved configuration from a previous connectivity status may be used as starting point for iteratively setting up the communication, thus in many situations decreasing the time required for determining the appropriate number of antennas and/or symbol rate.

The method, product means, and device described herein can be implemented by means of hardware comprising several distinct elements, and by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method of communicating a signal via a wireless communications channel between a transmitter and a receiver, at least one of the transmitter and the receiver comprising a plurality of transducers for transforming a signal between an electrical signal and a wireless signal, the method comprising:
   determining one of a measured and at least estimated delay spread of the wireless communications channel;
   based on at least the determined delay spread, selecting a number of transducers from the plurality of transducers;
   communicating a wireless signal from the transmitter to the receiver using the selected number of transducers, the selecting comprising selecting a minimum number of transducers to cause the determined delay spread to be smaller than a predetermined threshold.

2. The method of claim 1, wherein the transducers are antennas.

3. The method of claim 1, wherein the delay spread is determined from an estimated number of propagation paths.

4. The method of claim 1, wherein the selecting further comprises selecting said minimum number of transducers to allow processing the communicated wireless signal by the receiver without an equalizer.

5. The method of claim 1, wherein the receiver is an equalizer-free receiver.

6. The method of claim 1, wherein the selecting further comprises selecting said minimum number of transducers to cause a root-mean-squared delay spread to be smaller than a predetermined fraction of the time required to transmit a bit of information.

7. The method of claim 1, wherein the transmitter comprises a first plurality of transmitting transducers and the receiver comprises a second plurality of receiving transducers;
   wherein the selecting further comprises selecting a first number of said transmitting transducers and a second number of said receiving transducers; and
   wherein the communicating comprises communicating the wireless signal using the selected first number of transmitting transducers and the second number of receiving transducers.

8. The method of claim 1, wherein the determining comprises:
   communicating a test signal from the transmitter to the receiver using a least a subset of said plurality of transducers; and
   estimating said delay spread from the test signal received by the receiver.

9. The method of claim 1, wherein the communicating comprises performing a beamforming signal processing operation by at least one of the transmitter and the receiver for directional signal communication using the selected number of transducers.

10. The method of claim 1, wherein the method further comprises, based on the determined delay spread, selecting said number of transducers and a bit rate, and wherein the communicating comprises communicating the wireless signal from the transmitter to the receiver using the selected number of transducers and the selected bit rate.

11. The method of claim 10, wherein selecting the bit rate comprises, selecting a corresponding symbol rate, and wherein the communicating comprises communicating the wireless signal using the selected number of transducers and the selected symbol rate.

12. The communications device of claim 11, wherein the communications device is configured to, based on the determined delay spread, select said number of transducers and a bit rate; and
   communicate the signal from the transmitter to the receiver using the selected number of transducers and the selected bit rate.

13. A communications device for communicating a signal via a wireless communications channel, the communications device comprising:
   a plurality of transducers configured to transform a signal between an electrical signal and a wireless signal, the communications device is configured to:
   determine one of a measured and at least estimated delay spread of the wireless communications channel;
   based on at least the determined delay spread, select a number of transducers from the plurality of transducers, said selected number being a minimum number of transducers that cause the determined delay spread to be smaller than a predetermined threshold; and
   communicate the signal wirelessly using the selected number of transducers.

14. The communications device of claim 13 further comprising an equalizer-free receiver.

15. The communications device of claim 13, wherein the communications device is configured to:
   select a first number of said transmitting transducers and a second number of said receiving transducers; and
   communicate the wireless signal using the selected first number of transmitting transducers and second number of receiving transducers.

16. A communications system for communicating a signal, the system comprising:
   a transmitter device and a receiver device configured to communicate with each other via a wireless communications channel, at least one of the transmitter device and the receiver device including a communications device, the communication device comprising:

a plurality of transducers for transforming a signal between an electrical signal and a wireless signal, the communications device is configured to:
- determine one of a measured and at least estimated delay spread of the wireless communications channel;

based on at least the determined delay spread, select a minimum number of transducers to cause the determined delay spread to be smaller than a predetermined threshold; and communicate the wireless signal using the selected minimum number of transducers.

* * * * *

UNITED STATES PATENT AND TRADEMARK OFFICE
CERTIFICATE OF CORRECTION

PATENT NO.        : 9,100,073 B2
APPLICATION NO.   : 13/881402
DATED             : August 4, 2015
INVENTOR(S)       : Lindoff et al.

It is certified that error appears in the above-identified patent and that said Letters Patent is hereby corrected as shown below:

In the Claims

In Column 12, Line 32, in Claim 12, delete "communications device" and insert -- method --, therefor.

Signed and Sealed this
Twenty-first Day of June, 2016

Michelle K. Lee
*Director of the United States Patent and Trademark Office*